United States Patent
Liao et al.

(10) Patent No.: US 6,611,856 B1
(45) Date of Patent: Aug. 26, 2003

(54) PROCESSING MULTIPLY-ACCUMULATE OPERATIONS IN A SINGLE CYCLE

(75) Inventors: Yuyun Liao, Chandler, AR (US); Tom M. Hameenanttila, Phoenix, AR (US); David B. Roberts, Gilbert, AR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,836

(22) Filed: Dec. 23, 1999

(51) Int. Cl.[7] .................................................. G06F 7/38
(52) U.S. Cl. ........................................................ 708/523
(58) Field of Search ................................. 708/620, 625, 708/603, 501, 523

(56) References Cited

U.S. PATENT DOCUMENTS

| | | | |
|---|---|---|---|
| 4,754,421 A | * | 6/1988 | Bosshart .................... 708/620 |
| 4,809,212 A | * | 2/1989 | New et al. .................. 708/620 |
| 4,811,269 A | | 3/1989 | Hirose et al. |
| 4,852,037 A | | 7/1989 | Aoki |
| 4,958,312 A | * | 9/1990 | Ang et al. .................. 708/603 |
| 4,969,118 A | * | 11/1990 | Montoye et al. ............ 708/501 |

FOREIGN PATENT DOCUMENTS

| | | |
|---|---|---|
| EP | 0 316 036 | 5/1989 |
| EP | 0 377 837 | 7/1990 |

OTHER PUBLICATIONS

*Practical Two–Cycle Forwarding Mechanism for Floating Point Units*, IBM Technical Disclosure Bulletin, US, IBM Corp., New York, vol. 38, No. 8, Aug. 1, 1995, pp. 225–236.
*Multiply–Addition–An Ultra High Performance Dataflow*, IBM Technical Disclosure Bulletin, US, IBM Corp. New York, vol. 30, No. 3, Aug. 1, 1987, pp. 982–987).
IBM Technical Disclosure Bulletin, "Pipelined Hardware Multiplier with Extended Precision", Feb. 1981, vol. 23 Issue No. 9 pp. 4322–4323.*

* cited by examiner

Primary Examiner—Tan V. Mai
(74) Attorney, Agent, or Firm—Trop, Pruner & Hu, P.C.

(57) ABSTRACT

A multiply-accumulate unit, or MAC, may achieve high throughput. The MAC need not use redundant hardware, such as multiple Wallace trees, or pipelining logic, yet may perform Wallace tree and carry look-ahead adder functions simultaneously for different operations.

15 Claims, 8 Drawing Sheets

|  | # OF 16-BIT MULTIPLICATION OPERATIONS |   |   |   |   |   |   |   |   |   |   |   |   |   |   |   |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 |   |
| CYCLE 0 | W |   |   |   |   |   |   |   |   |   |   |   |   |   |   |   |
| CYCLE 1 | C | W |   |   |   |   |   |   |   |   |   |   |   |   |   |   |
| CYCLE 2 |   | C | W |   |   |   |   |   |   |   |   |   |   |   |   |   |
| CYCLE 3 |   |   | C | W |   |   |   |   |   |   |   |   |   |   |   |   |
| CYCLE 4 |   |   |   | C | W |   |   |   |   |   |   |   |   |   |   |   |
| CYCLE 5 |   |   |   |   | C | W |   |   |   |   |   |   |   |   |   |   |
| CYCLE 6 |   |   |   |   |   | C | W |   |   |   |   |   |   |   |   |   |
| CYCLE 7 |   |   |   |   |   |   | C | W |   |   |   |   |   |   |   |   |
| CYCLE 8 |   |   |   |   |   |   |   | C | W |   |   |   |   |   |   |   |
| CYCLE 9 |   |   |   |   |   |   |   |   | C | W |   |   |   |   |   |   |
| CYCLE 10 |   |   |   |   |   |   |   |   |   | C | W |   |   |   |   |   |
| CYCLE 11 |   |   |   |   |   |   |   |   |   |   | C | W |   |   |   |   |
| CYCLE 12 |   |   |   |   |   |   |   |   |   |   |   | C | W |   |   |   |
| CYCLE 13 |   |   |   |   |   |   |   |   |   |   |   |   | C | W |   |   |
| CYCLE 14 |   |   |   |   |   |   |   |   |   |   |   |   |   | C | W |   |
| CYCLE 15 |   |   |   |   |   |   |   |   |   |   |   |   |   |   | C | W |

FIGURE 3

W- WALLACE TREE
C- CARRY LOOK-AHEAD ADDER

PROCESSING MULTIPLY-ACCUMULATE OPERATIONS IN A SINGLE CYCLE

BACKGROUND

This invention relates to processor-based systems and, more particularly, to multiply-accumulate units.

A multiply-accumulate unit, or MAC, is a unit designed to perform multiplication operations. In a processor-based system, for example, such operations may be plentiful.

MACs may be implemented using a variety of logic. Because of the abundance of multiplication operations in some applications, the fastest performing MAC is generally preferred. The success of any MAC design may depend upon the power requirements, the available space which may be allocated to MAC circuitry, and the intended use for the MAC, among other considerations.

Usually, however, a tradeoff between speed and cost makes the design of an optimally performing MAC difficult. The cost may come in the form of additional hardware, the chip space necessary to accommodate that hardware, or in the power needed to drive the hardware.

For example, in many digital signal processing, or DSP, applications, some critical operations may involve a series of multiplications and or accumulations. Accordingly, a high-throughput MAC is essential to achieving high performance. However, many DSP applications today require low power consumption, particularly in the portable electronics market.

Thus, there is a continuing need for a MAC which may achieve high throughput without excessively consuming power.

SUMMARY

In one embodiment of the invention, a method includes receiving a first set of operands in a first portion of a unit, performing a plurality of operations on the first set of operands to arrive at a first intermediate result and receiving a second set of operands in the first portion of the unit. Following these, a second plurality of operations is performed on the first intermediate result to arrive at a first final result while the first plurality of operations is performed on the second set of operands to arrive at a second intermediate result.

Advantages and other features of the invention will become apparent from the following description, the drawings, and the claims.

BRIEF DESCRIPTION OF THE DRAWINGS

FIG. 3 is a chart of the performance time for 16-bit multiplication operations using the MAC of FIG. 1 according to one embodiment of the invention;

DETAILED DESCRIPTION

Figure 1:
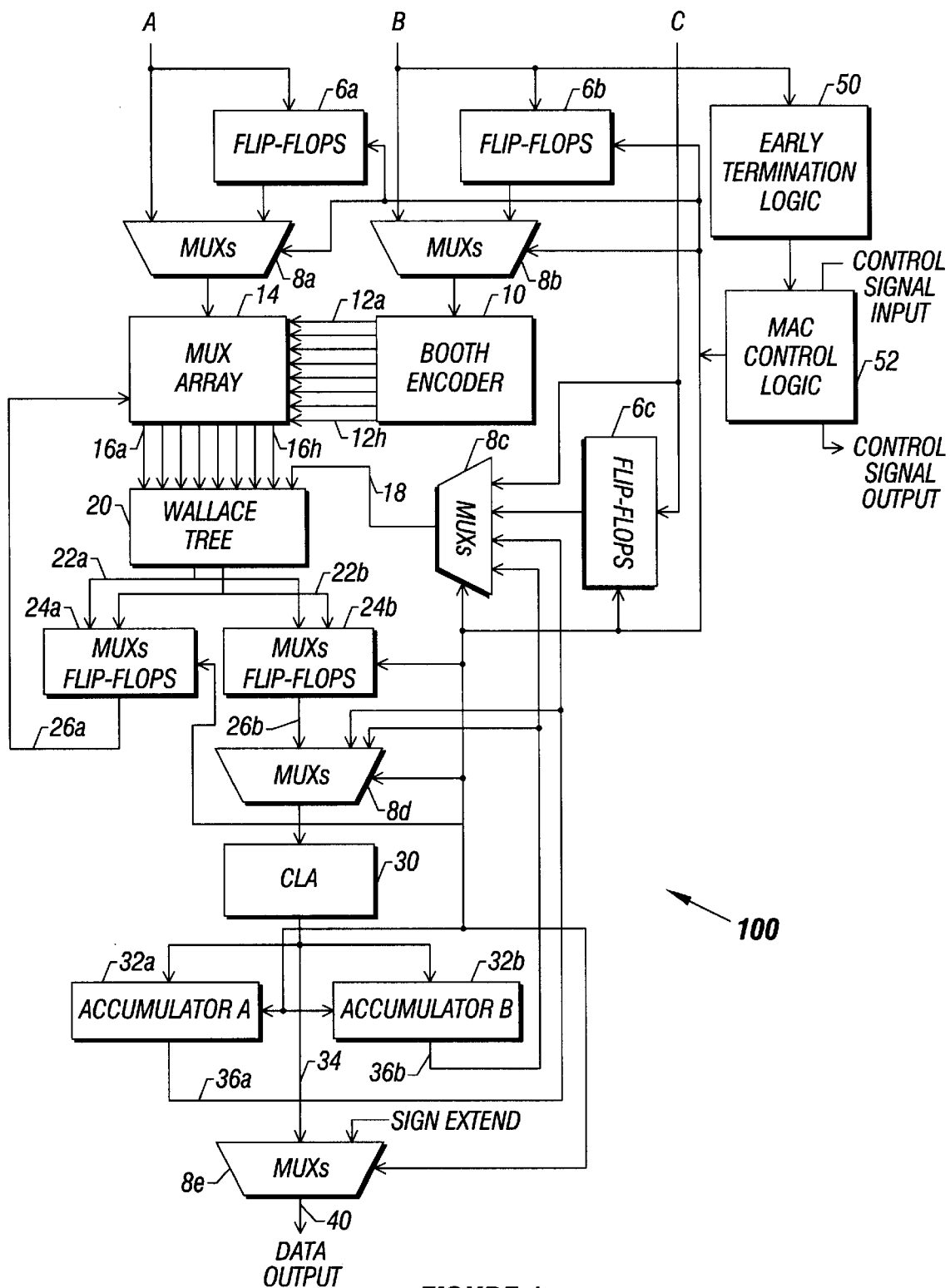
FIG. 1 is a block diagram of a multiply accumulate unit according to one embodiment of the invention.

At the most basic level, a MAC may receive two integer values, multiply the values together and send out the result of the operation. For some applications, an additional constant value, an accumulate value, may be added to the result. So, the MAC may produce a result, d, from the multiplication of a multiplicand, a, and a multiplier, b, plus the accumulation of c, as shown in the following equation:

$$d=(a \times b)+c$$

Multiplication operations may essentially be performed as a series of additions of partial products. To achieve optimum performance, MACs may include features which perform addition operations more quickly or which reduce the number of necessary addition operations.

For example, a MAC typically includes a Booth encoder, also called a Booth recoder or Booth multiplier. A Booth encoder may reduce the number of stages used to perform the multiplication. The number of partial products that are added together thus may be reduced. For example, for a 16-bit word, the number of partial products may be reduced from sixteen to eight, a factor of two.

Another feature which may be found in a MAC is known as a Wallace tree. Wallace trees are structures for performing multiple addition operations. Wallace trees typically include features, such as adders, to help perform the addition of multiple partial products.

For example, a Wallace tree may include a group of carry-save adders. A 3-to-2 carry-save adder, for example, receives three inputs, a, b, and c, and produces two outputs, a sum, y, and a carry, z, as illustrated by the following equation:

$$a+b+c=y+z*2$$

The output carry is "saved" for the next operation, thus, the name.

Wallace trees may organize carry-save adders or similar logic such that a number of input values typically produces two results, a sum value and a carry value. For example, a four-stage Wallace tree may include four stages of 3-to-2 carry-save adders. The four-stage Wallace tree may receive nine input vectors, and produce a sum vector and a carry vector as its result.

Another feature of many MAC designs is logic for adding all the bits of two vectors, to produce a final result, for example. A carry look-ahead adder, or CLA, is one such logic device. The CLA may efficiently perform the addition of two multi-bit operands.

Especially for digital signal processing and other applications, the ability of the MAC to multiply 16-bit signed integers at a very fast rate is a paramount concern. To speed up the multiplication of 16-bit and even larger integer operations, the MAC could include additional circuitry. For example, each component of the MAC could be duplicated, such that multiple operations run simultaneously. Control logic to keep track of the parallel operations would be part of the MAC as well. However, the additional hardware may be costly, the available space may be limited, and additional power to support the new hardware may be used.

Another MAC design may pipeline the operations, such that a new multiply operation may be processed while a prior operation is not yet completed by the MAC hardware, somewhere down the pipeline. Pipelining may involve a number of stages of the operation being performed, each stage operating independently from the others. Pipelining may thus utilize additional control logic and hardware, such as registers, for temporarily storing the state of the two, three, or more, independent operations being conducted simultaneously by the MAC hardware. Although less costly than providing parallel hardware, the additional control logic may add to development cost and diminish available board or chip space. Further, a MAC which supports pipelining may run more slowly.

A higher throughput MAC may be implemented using conventional architectural features, without excessively impacting the cost or power requirements of the hardware. In some embodiments of the invention, a MAC design provides a single-cycle throughput for 16-bit multiplication operations by simultaneously operating two functional units of the MAC.

In FIG. 1, a MAC 100 includes a Booth encoder 10, a multiplexer, or MUX, array 14, a Wallace tree 20, and a carry look-ahead adder, or CLA, 30, according to one embodiment of the invention. The MAC 100 may receive two input values, a multiplicand, A, and a multiplier, B, as well as an accumulate data value, C. The input values A, B, and C may be 16-bit, 32-bit, or larger signed integer values, for example.

In one embodiment of the invention, the Booth encoder receives up to sixteen bits of the multiplier, B, at a time, and thus produces up to eight control signals 12a–12h. The MUX array 14 receives the eight control signals 12a 12h from the Booth encoder 10 as well as receiving the multiplicand, A. The MUX array 14 produces up to eight partial products, 16a–16h, which are then sent to the Wallace tree 20.

In one embodiment of the invention, the Wallace tree 20 is a four-stage unit, including a plurality of carry-save adders (not shown). The Wallace tree 20 thus receives nine input signals and produces two output signals, a sum vector 22a and a carry vector 22b. The sum vector 22a and the carry vector 22b may subsequently be fed into the CLA 30, to be added together. Alternatively or simultaneously, the sum vector 22a and the carry vector 22b may be routed back to the MUX array 14, for further processing.

The MAC 100 includes three banks of flip-flops 6a–6c. The flip-flops 6 enable portions of the multiplicand A, the multiplier B, and the accumulate data C to be sent to the other logic of the MAC 100 for processing. For example, if a 32-bit multiplier, B[31:0], is sent to the MAC 100 as part of a multiplication operation, the flip-flops 6b may toggle between two 16-bit portions, B[31:16] or B[15:0], controlling which portion of the multiplier B is sent to the Booth encoder 10.

The MAC 100 also includes MUXs 8a–8e. The MUXs 8 may control the receipt of a signal by a subsequent unit of the MAC 100. For example, the MUXs 8a–8c work in conjunction with the flip-flops 6a–6c to control which portion of the multiplicand A, the multiplier B, or the accumulator C may be received by the MUX array 14, the Booth encoder 10, or the Wallace tree 20, respectively. The MUXs 8d control receipt of the sum vector 22a and the carry vector 22b by the CLA 30. The MUXs 8e enable the output value 34 from the CLA 30 to be sign-extended, if needed.

The MAC 100 includes two banks of MUXs and flip-flops units 24a and 24b which receive the output signals 22a and 22b from the Wallace tree 20. The MUXs and flip-flops unit 24a is used to feed part of the sum vector 22a and the carry vector 22b back to the MUX array 14. The portion 26a fed back to the MUX array 14 depends upon the type of operation being performed. Such feedback is a feature common to multi-stage MAC operations, such as for performing a 32-bit multiplication.

The MAC 100 includes a second MUXs and flip-flops unit 24b, to which the sum vector 22a and the carry vector 22b are also sent. Subsequently, these values may be sent to the CLA 30 via the MUXs 8d. In one embodiment of the invention, the sum vector 22a and the carry vector 22b are sent to both units 24a and 24b simultaneously.

In some embodiments of the invention, the MAC 100 includes architectural enhancements which may improve throughput for multiplication operations. For example, in one embodiment of the invention, the MAC 100 includes two registers, an accumulator A 32a and an accumulator B 32b. The accumulators 32 may receive the result vector 34 from the CLA 30. In one embodiment of the invention, the result vector 34 is alternatively stored in the accumulators 32. For example, in a first operation, the result vector, which may be an intermediate result, is stored in the accumulator A 32a. In a subsequent operation, the subsequent result vector is stored in the accumulator B 32b.

The accumulators 32 are each connected to the MUXs 8c, for submission to the Wallace tree 20. The configuration allows the values stored in either accumulator 32 to be submitted to the Wallace tree 20 as the accumulate data instead of receiving the accumulated data from a source (C) external to the MAC 100. As will be shown below, the accumulators 32 may facilitate the throughput of operations performed in the MAC 100 in one embodiment of the invention.

The MAC 100 may support implicit instructions such as an implicit multiply instruction. An implicit instruction is one where one or more intermediate results may be stored internally to the MAC, such as in a register. Including a register in the MAC circuitry may allow the MAC to avoid sending intermediate results to a storage location outside the MAC over an external bus, for example. Thus, a MAC which supports implicit operations may process instructions more quickly than a MAC with no such support.

For many multiplication operations, the MAC circuitry may provide multiple intermediate results before arriving at the final result. The conventional MAC design typically receives an intermediate result, an intermediate sum vector and an intermediate carry vector, from the Wallace tree and feeds the results back into the MUX array for subsequent processing. This scheme is repeated as necessary. Eventually, the sum vector and the carry vector produced by the Wallace tree represent the final result. These values are subsequently sent to the CLA, where they are added together and sent out of the MAC circuitry as the final result.

In the embodiment of FIG. 1, the intermediate sum vector 22a and the intermediate carry vector 22b may be sent to the CLA 30 in each cycle, if desired. The CLA 30 may then add the intermediate sum vector 22a and the intermediate carry vector 22b, to produce an intermediate result 34, which may then be stored in one of the accumulators 32.

Feedback logic in the MAC 100 design permits the intermediate result 34 to be fed from one of the accumulators 32 back into the Wallace tree 20, via the MUXs 8c, as accumulate data 18. Recall that the Wallace tree 20 includes an input line 18 for the accumulator C. In FIG. 1, the MUXs 8c permit the source of the accumulate data 18 to include the accumulators 32.

In one embodiment of the invention, the MAC 100 provides circuitry which allows simultaneous operation of both the Wallace tree 20 and the CLA 30. This circuitry includes early termination logic 50 and MAC control logic 52, in one embodiment of the invention. This circuitry may control the simultaneous processing of more than one multiplication operation or of more than one portion of a single multiplication operation by the MAC 100.

In a typical implementation, a MAC may receive signed binary values as operands. For example, a two's complement notation may be used. In two's complement notation, the most significant bit of the value may represent the sign: zero for positive values, one for negative values. Accordingly, in two's complement notation, the 16-bit operand FFC1h may represent −63d and the operand 003Fh may represent +63d.

Additionally, 16-bit values may be represented as 32-bit values, for some applications. The sign bit (bit fifteen) may thus be "extended" or duplicated in the upper sixteen bits. The sign-extended operand FFFFFFC1h may thus again represent −63d while the operand 0000003Fh may represent +63d. The upper seventeen bits of both operands are identical, as the sign bit (bit fifteen) is extended. Likewise, for either value, the upper sixteen bits are not needed to perform a multiplication operation.

In one embodiment of the invention, the early termination logic 50 uses this feature of signed binary values to the advantage of the MAC 100. In FIG. 1, the early termination logic 50 receives a signal from the multiplier B. The early termination logic 50 may be invoked when the upper seventeen bits of a 32-bit multiplier B are identical. In such a case, the upper sixteen bits of the multiplier B are not used in the multiplication operation.

Once invoked, the early termination logic 50 sends a signal to the MAC control logic 52. The MAC control logic 52 controls the flip-flops 6, the MUXs 8, and the MUXs and flip-flops 24, as well as the accumulators 32. The MAC control logic 52 thus may enable the next multiplicand A to be latched by the flip-flops 6a and the MUXs 8a, the next multiplier B to be latched by the flip-flops 6b and the MUXs 8b, or the next accumulate data C to be latched by the flip-flops 6c and the MUXs 8c.

Additionally, the MAC control logic 52 may control the routing of the intermediate sum vector 22a and the intermediate carry vector 22b, received from the Wallace tree 30. The MAC control logic 52 may enable the MUXs and flip-flops 24a, the MUXs and flip-flops 24b, and the MUXs 8d, as needed.

The MAC control logic 52 further controls the accumulator A register 32a and the accumulator B register 32b, permitting the values contained therein to be routed back to the Wallace tree 20 as accumulate input 18. Finally, the MAC control logic 52 may control the MUXs 8e such that the final output vector 34 may be sign-extended, if desired, and produce the output value 40.

In one embodiment of the invention, the MAC control unit 52 may receive control signals from a source external to the MAC 100, such as an instruction decoder (not shown). The MAC control unit 52 may also submit control signals to another source external to the MAC 100.

Depending upon the operation being performed, the MAC 100 may produce intermediate vector values. For example, in one embodiment of the invention, the Booth encoder 10 receives a 16-bit value from the multiplier, B. Accordingly, to multiply two 32-bit numbers, or a 16-bit multiplicand and a 32-bit multiplier, the Booth encoder 10 may receive the lower sixteen bits of the multiplier in a first cycle and then receive the upper sixteen bits of the multiplier in a second cycle. Likewise, the other circuitry of the MAC 100 may receive data in both a first and a second cycle. The multiplication operation thus takes, at a minimum, two cycles to complete.

For some operations, the MAC 100 may achieve single-cycle throughput. In one embodiment of the invention, the MAC 100 achieves single-cycle throughput in performing 16-bit multiplication operations. Following receipt of the first set of operands into the MAC 100, the Wallace tree 66 and the CLA 68 may simultaneously process all subsequent operands. For example, the Wallace tree 66 may be processing data for cycle n, while, at the same time, the CLA 68 is processing data for cycle n−1.

Figure 2A:
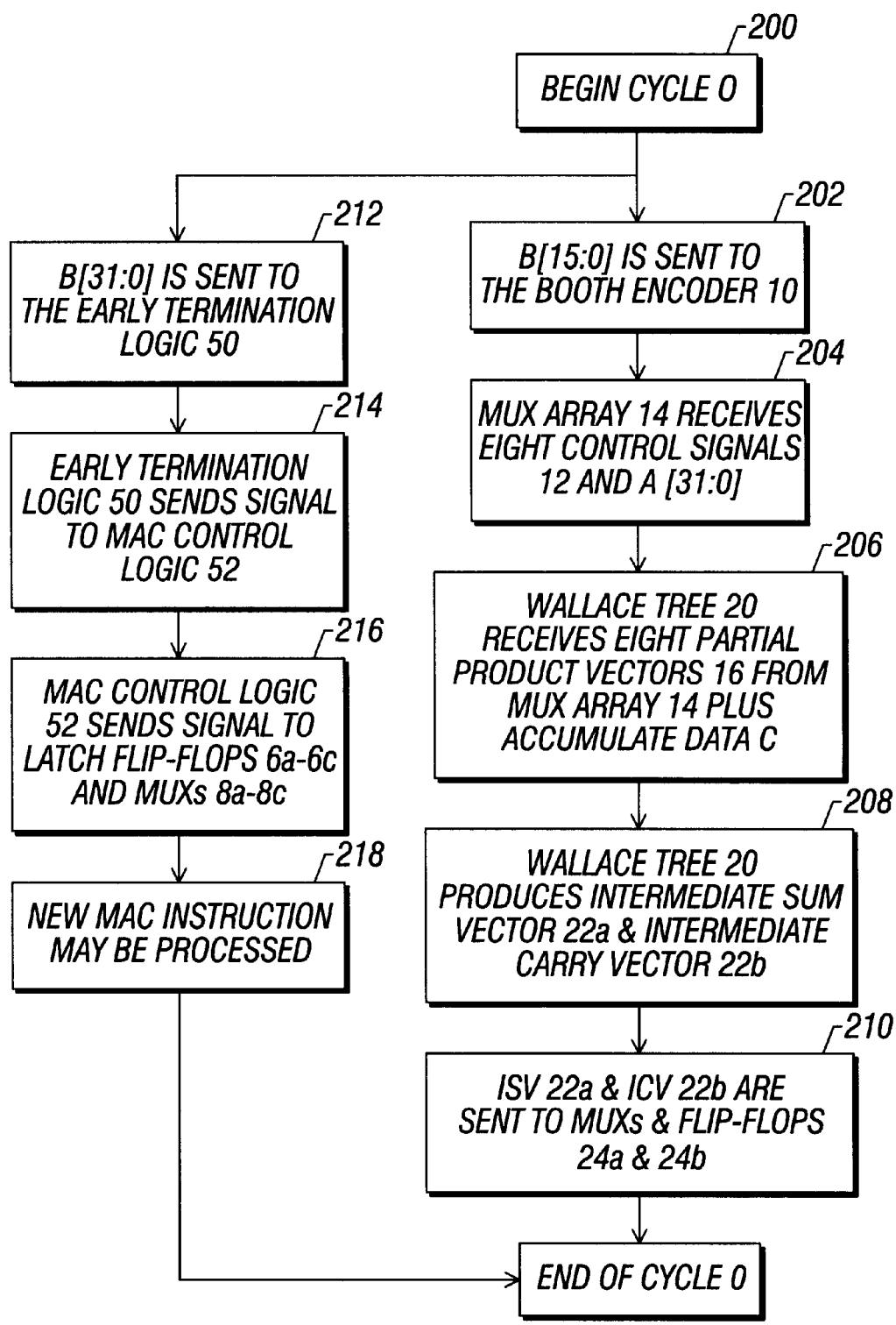
FIGS. 2A and 2B are flow diagrams of a multiply operation performed using the MAC of FIG. 1 according to one embodiment of the invention.

In FIG. 2A, a flow diagram illustrates how the MAC 100 logic processes a multiply or multiply/accumulate operation. In this example, two 16-bit operands are sign-extended as 32-bit values. Such operands are common in DSP applications and may particularly illustrate performance of the early termination logic 50 in the MAC 100. The MAC 100, however, may perform multiply or multiply/accumulate operations on operands with other characteristics.

A first cycle, cycle 0, begins (block 200). In one embodiment of the invention, the lower sixteen bits of the multiplier B[15:0] are sent to the Booth encoder 10 (block 202). The MUX array 14 receives eight control signals 12 from the Booth encoder 10 as well as the multiplicand A[31:0] (block 204). The MUX array 14 processes these signals such that the Wallace tree 20 receives eight partial product vectors 16 from the MUX array 14. Additionally, the Wallace tree 20 receives accumulate data C[31:0] (block 206). From this data, the Wallace tree 20 produces an intermediate sum vector (ISV) 22a and an intermediate carry vector (ICV) 22b (block 208). The intermediate sum vector 22a and the intermediate carry vector 22b are sent to the MUXs and flip-flops 24a and 24b (block 210).

Independently from the preceding operations, at the beginning of cycle 0 (block 200), the early termination logic 50 may receive the 32-bit multiplier B[31:0] (block 212). Because the operands are sign-extended 16-bit values, the upper seventeen bits of the multiplier B are identical. Accordingly, the early termination logic 50 sends a signal to the MAC control logic 52 (block 214). The MAC control logic 52 then sends a signal to latch the flip-flops 6a, 6b and 6c as well as the MUXs 8a, 8b and 8c (block 216). In this manner, the MAC control logic 52 enables the circuitry to latch the next MAC operands A, B and C.

Figure 2B:
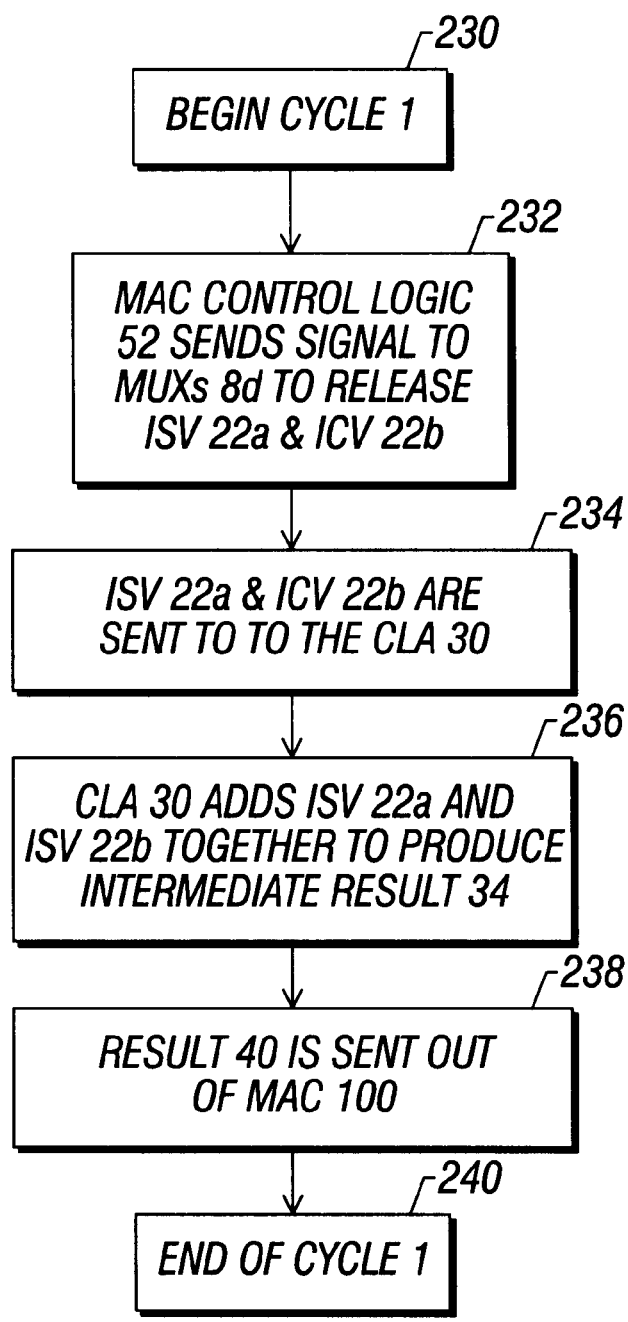

In FIG. 2B, the second cycle, cycle one, is a continuation of the operations of FIG. 2A. After cycle one begins (block 230), the MAC control logic 52 sends a signal to the MUXs 8d to release the intermediate sum vector 22a and the intermediate carry vector 22b (block 232). The intermediate sum vector 22a and the intermediate carry vector 22b are sent to the CLA 30 (block 234). Accordingly, the CLA 30 adds the intermediate sum vector 22a and the intermediate carry vector 22b together (block 236). The result 40 is then sent out of the MAC 100 (block 238). Thus, cycle one is completed.

In FIG. 3, the single-cycle throughput of 16-bit multiplication operations using the MAC 100 according to one embodiment of the invention may be demonstrated using a chart. At the top of the chart, a numbered series of 16-bit multiplication operations performed by the MAC 100 is depicted. On the left side of the chart, the cycle in which an operation was performed is specified. The chart tracks operations performed by the Wallace tree 20, indicated as "W", and the CLA 30, indicated as "C" according to one embodiment of the invention.

For the first 16-bit multiplication operation, the Wallace tree 20 is executed in cycle zero while the CLA 30 is executed in cycle one. For the second 16-bit multiplication operation, the Wallace tree 20 is executed in cycle one and the CLA 30 is executed in cycle two. The execution of the CLA 30 for the first multiplication operation occurs simultaneously with the execution of the Wallace tree 20 for the second 16-bit multiplication operation. As the chart demonstrates, the subsequent 16-bit multiplication operations proceed like the two already described. At the end of the fifteenth cycle, fifteen 16-bit multiplication operations have been completed. For some multiplication operations according to one embodiment of the invention, the MAC 100 thus provides a single-cycle throughput.

The accumulators 32 allow the MAC 100 to perform implicit multiply and multiply/accumulate operations. In a second embodiment, the MAC 100 may include a single accumulator. The accumulators 32 may be implicitly referenced by several implicit instructions. Those implicit multiply/accumulate instructions reference the accumulators 32 instead of a register-specified accumulator.

Figure 4A:
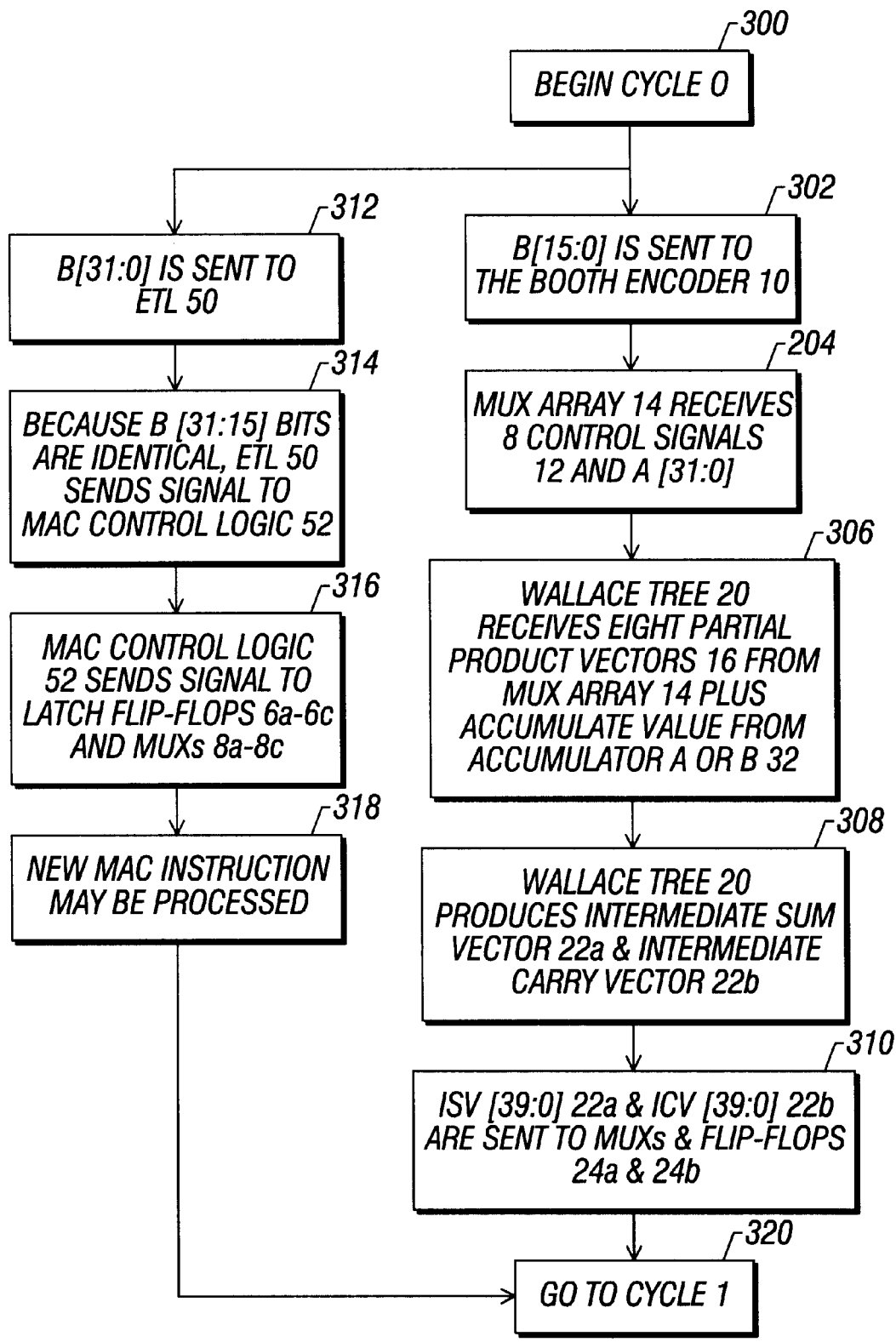
FIGS. 4A–4C are flow diagrams of an implicit multiply operation performed using the MAC of FIG. 1 according to one embodiment of the invention.

For example, the instructions in one embodiment of the invention, MAR or MRA may be received by the MAC control logic 52 in order for the accumulators 32 to be read from or written to, respectively. In FIG. 4A, a flow diagram illustrates the implicit multiply/accumulate operation in which early termination is invoked. Recall that, in order for early termination to be invoked, the other seventeen bits of the multiplier B are all zeros or all ones.

When cycle zero begins (block 300), the multiplier B[15:0] is sent to the Booth encoder 10 (block 302). The MUX array 14 then receives eight control signals 12 from the Booth encoder 10 as well as the multiplicand A[31:0] (block 304).

The Wallace tree 20 receives eight partial product vectors from the MUX array 14. Additionally, the Wallace tree 20 receives an accumulate value from either accumulator A 32a or accumulator B 32b (block 306). The Wallace tree 20 subsequently produces an intermediate sum vector 22a and an intermediate carry vector 22b (block 308).

In one embodiment of the invention, the carry look-ahead adder 30 is a 40-bit CLA, which may perform 16-bit DSP operations. Likewise, the accumulator A register 32a and the accumulator B register 32b are 40-bit registers. Thus, in the next operation, the lower 40 bits of the intermediate sum vector 22a and the intermediate carry vector 22b are sent to the MUXs and flip-flops 24a and 24b (block 310).

Also at the beginning of cycle zero, the entire 32-bit multiplier B is sent to the early termination logic (ETL) 50 (block 312). Because the upper seventeen bits of the multiplier B are identical, the early termination logic 50 sends a signal to the MAC control logic 52 (block 314). The MAC control logic 52 then sends a signal to latch the flip-flops 6a, 6b, and 6c as well as the MUXs 8a, 8b, and 8c (block 316). This indicates that the Wallace tree 20 will be available to accept the next implicit multiply/accumulate instruction in the next cycle (block 318).

Figure 4B:
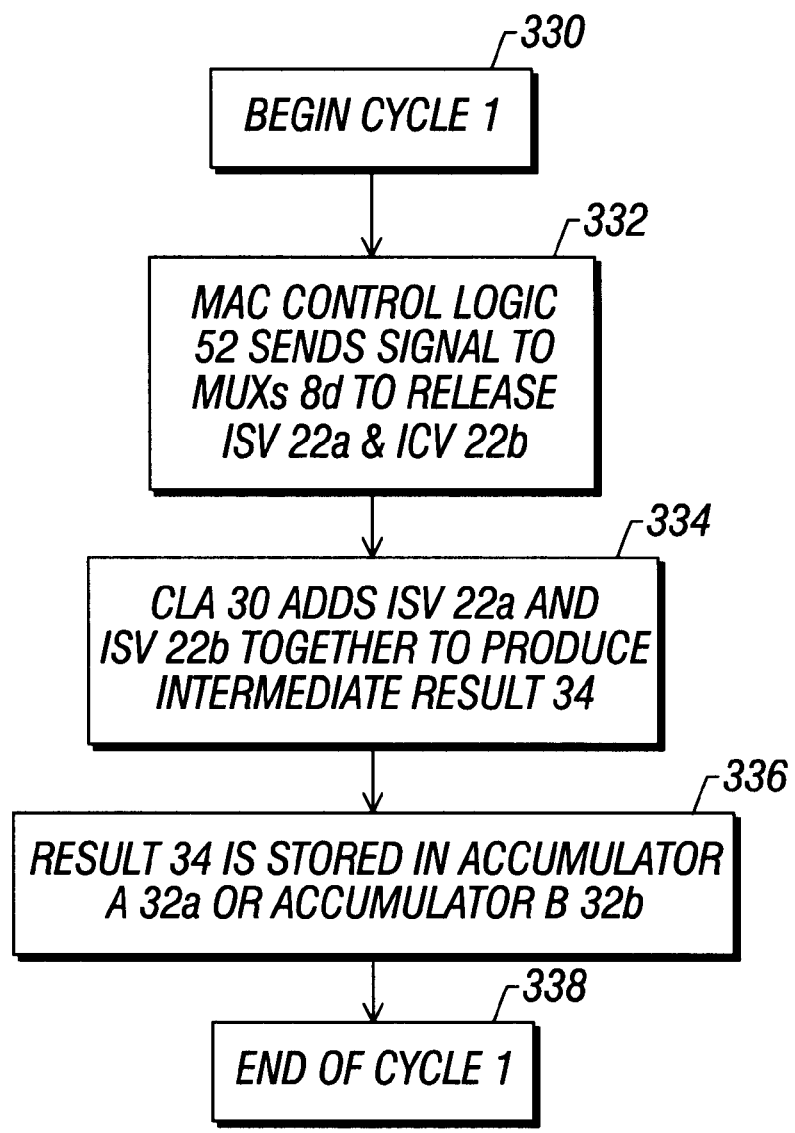

In FIG. 4B, cycle 1 begins (block 330). The MAC control logic 52 sends a signal to the MUXs 8d to release the intermediate sum vector 22a and the intermediate carry vector 22b (block 332). The CLA 30 then adds the two values 22 together to produce an intermediate result 34 (block 334). Because this is an implicit instruction, the result 34 is next stored in either accumulator A 32a or accumulator B 32b (block 336). This completes the end of cycle one (block 338).

In one embodiment of the invention, the MAC 100 may receive implicit instructions which reference the accumulators. These instructions may be received from the MAC control logic 52, which ultimately controls the accumulator A 32a and the accumulator B 32b.

Figure 4C:
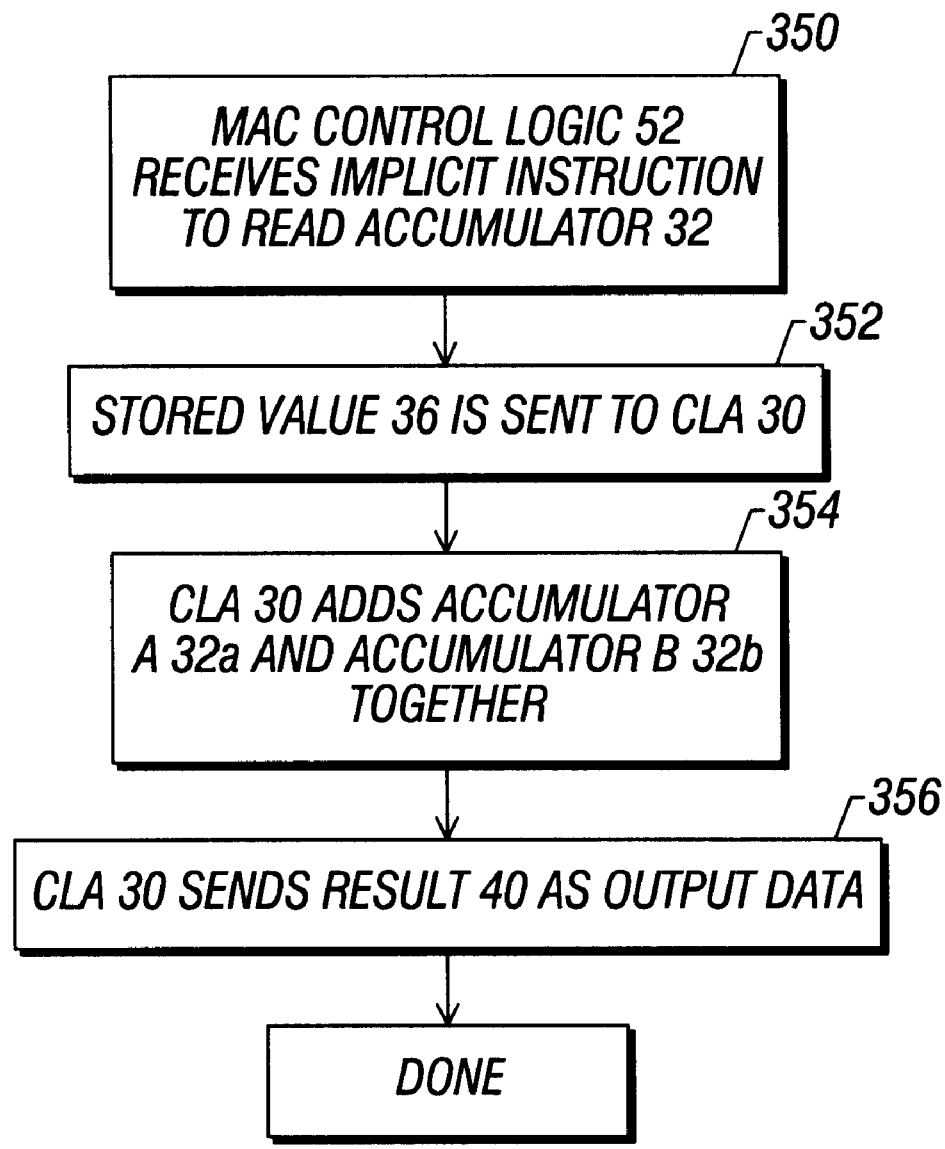

For example, in FIG. 4C, the MAC control logic 52 may receive an implicit instruction for reading the accumulator A 32a (block 350). The values stored in the accumulator A 32a and the accumulator B 32b are sent to the CLA 30 (block 352). The CLA 30 then adds the values 36a and 36b together (block 354). The CLA 30 then sends the result 40 as output data (block 356). The result 40 may then be sent to a register file external to the MAC 100.

Figure 5:
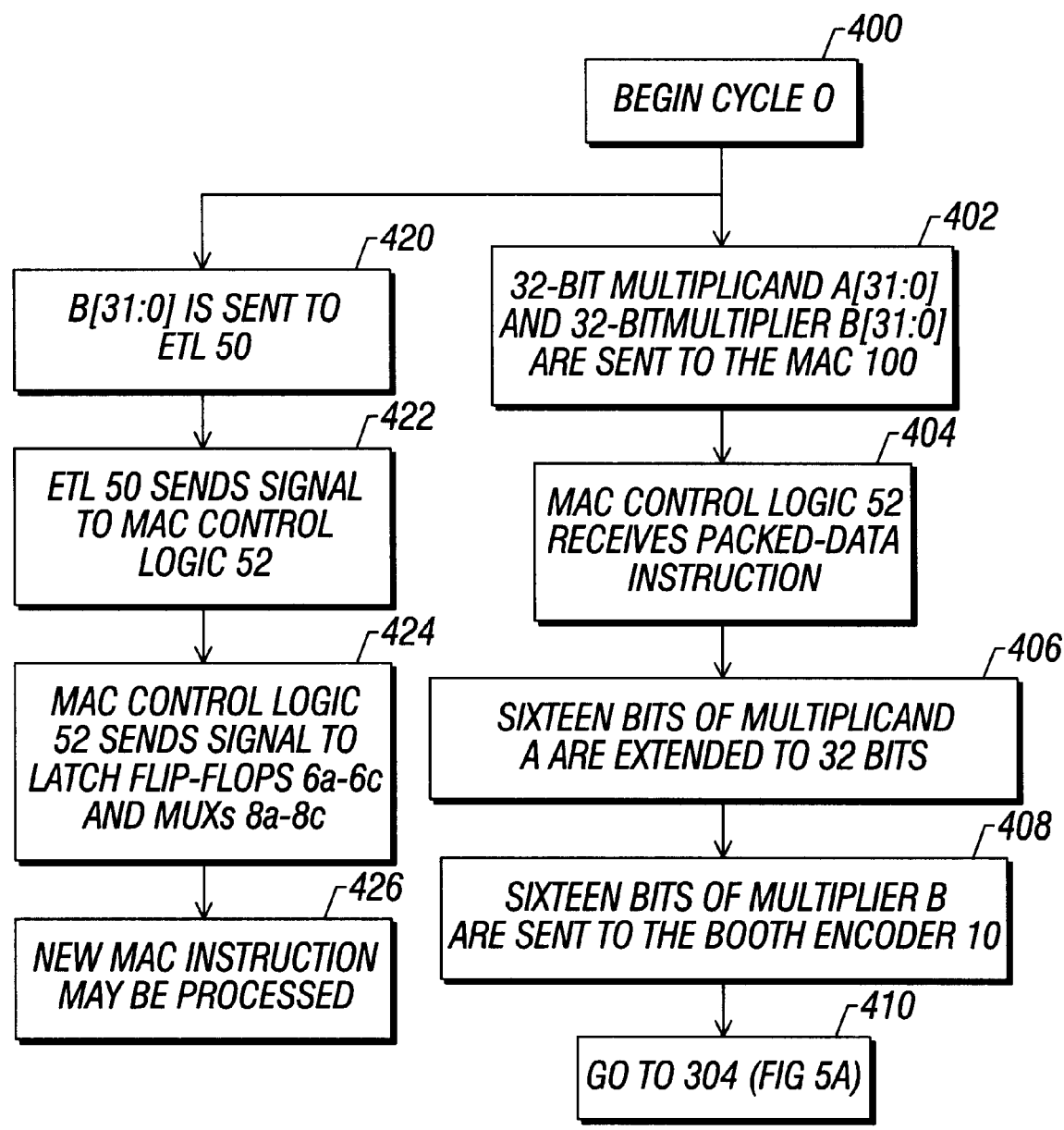
FIG. 5 is a flow diagram of a multiply operation using packed data instructions performed using the MAC of FIG. 1 according to one embodiment of the invention.

In FIG. 5, a multiply with implicit accumulate operation uses packed data instructions. In one embodiment of the invention, the MAC 100 may receive four different packed data instructions. These four packed data instructions operate on sixteen bits or half of two 32-bit operands. For example, one instruction may operate on the lower sixteen bits of both the multiplier B and the multiplicand A. Another may operate on the upper sixteen bits of the multiplicand A and the lower sixteen bits of the multiplier B. Ultimately, each packed-data instruction thus performs a 16-bit multiply operation on two 16-bit operands.

At the beginning of cycle zero (block 400), a 32-bit multiplicand A[31:0] and a 32-bit multiplier B[31:0] are sent to the MAC 100 (block 402). The MAC control logic 52 also receives a packed-data instruction (block 404).

Sixteen bits of the multiplicand A are extended to 32 bits. For example, if the packed-data instruction is operating on the lower sixteen bits of the multiplicand A, then the upper sixteen bits of the multiplicand A are replaced with the contents of the 16th bit of the multiplicand A. In essence, the sign is extended from the 16th to the 32nd bit. Likewise, if the packed-data instruction is operating on the upper sixteen bits of the multiplicand A, then the upper sixteen bits are shifted to the lower 16 bits and the upper sixteen bits are filled with the value of the sign bit.

Sixteen bits of the multiplier B are sent to the Booth encoder 10 (block 408). For example, if the packed-data instruction operates on the lower half of the multiplier B, then B[15:0] are sent to the Booth encoder 10. Likewise, for a packed-data instruction which operates on the upper half of the multiplier B, the B[31:16] bits are sent to the Booth encoder 10.

From this point, the packed-data instructions are operated upon just as any other implicit instruction would be. Accordingly, the next operation to be performed by the MAC 100 is in FIG. 4A (block 304).

Just as for other operations, the MAC 100 is simultaneously determining whether the early termination logic 50 will be invoked. That is, the multiplier B[31:0] is sent to the early termination logic 50 (block 420). Because the upper seventeen bits of the multiplier B are identical, the early termination logic 50 sends a signal to the MAC control logic 52 (block 422). The MAC control logic 52 then sends a signal to latch the flip-flops 6a, 6b, and 6c as well as the MUXs 8a, 8b and 8c (block 424). This allows a new MAC instruction to be processed in the next cycle (block 426).

Thus, a multiply-accumulate unit may provide single-cycle throughput for certain operations. In one embodiment of the invention, the MAC avoids using redundant hardware, which may consume additional power, and includes no pipelining circuitry, which may run more slowly. Instead, the Wallace tree and the carry look-ahead adder which are part of the MAC may simultaneously operate. Where such simultaneous operations occur, a higher throughput may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus, comprising:
a structure to perform multiple addition operations on a first operand and a second operand;
an adder; and
a controller to permit a first operation to be performed on a portion of the first operand using the structure while the adder is to perform a second operation on another portion of the first operand, wherein the controller is to permit the first operation and the second operation based on whether a plurality of most significant bits of the second operand are identical.

2. The apparatus of claim 1, further comprising an internal storage medium coupled to the adder.

3. The apparatus of claim 2, wherein the internal storage medium comprises one or more accumulators.

4. The apparatus of claim 3, wherein one or more accumulators are coupled to the output of the adder.

5. The apparatus of claim 1, wherein the structure comprises a Wallace tree.

6. The apparatus of claim 5, wherein the Wallace tree comprises a plurality of carry-save adders.

7. The apparatus of claim 6, wherein the Wallace tree is a four-stage Wallace tree.

8. The apparatus of claim 6, wherein the Wallace tree receives nine input vectors and produces two output vectors.

9. The apparatus of claim 1, wherein the adder is a carry look-ahead adder.

10. The apparatus of claim 1, further comprising a Booth encoder coupled to the structure.

11. An apparatus comprising:
a structure to perform multiple addition operations on sets of operand pairs to obtain first results;
an adder; and
a controller to permit a first operation to be performed on a second of the sets of operand pairs using the structure while the adder is to perform a second operation on the first results of a first of the sets of operand pairs, based on whether a plurality of most significant bits of at least one of the first of the sets of operand pairs is identical.

12. The apparatus of claim 11, wherein the structure comprises a Wallace tree.

13. The apparatus of claim 11, wherein the adder comprises a carry look-ahead adder.

14. The apparatus of claim 11, further comprising a Booth encoder coupled to the structure.

15. The apparatus of claim 11, wherein one or more accumulators are coupled to an output of the adder.

* * * * *